(12) United States Patent
Duttlinger, Jr. et al.

(10) Patent No.: US 10,968,121 B2
(45) Date of Patent: Apr. 6, 2021

(54) PROCESS FOR THE TREATMENT OF PRODUCED WATER FROM CHEMICAL ENHANCED OIL RECOVERY

(71) Applicant: Ecolab USA Inc., St. Paul, MN (US)

(72) Inventors: William T. Duttlinger, Jr., Houston, TX (US); Brian Scott Caird, Aberdeenshire (GB)

(73) Assignee: ChampionX USA Inc., Sugar Land, TX (US)

( * ) Notice: Subject to any disclaimer, the term of this patent is extended or adjusted under 35 U.S.C. 154(b) by 269 days.

(21) Appl. No.: 15/741,050

(22) PCT Filed: Jun. 24, 2016

(86) PCT No.: PCT/IB2016/053785
§ 371 (c)(1),
(2) Date: Dec. 29, 2017

(87) PCT Pub. No.: WO2017/001988
PCT Pub. Date: Jan. 5, 2017

(65) Prior Publication Data
US 2018/0346356 A1 Dec. 6, 2018

(30) Foreign Application Priority Data
Jun. 29, 2015 (GB) .................................... 1511376

(51) Int. Cl.
*C02F 1/56* (2006.01)
*C02F 1/68* (2006.01)
(Continued)

(52) U.S. Cl.
CPC .................. *C02F 1/56* (2013.01); *C02F 1/24* (2013.01); *C02F 1/385* (2013.01); *C02F 1/5245* (2013.01);
(Continued)

(58) Field of Classification Search
CPC ....................................................... C02F 1/56
See application file for complete search history.

(56) References Cited

U.S. PATENT DOCUMENTS 5,164,095 A * 11/1992 Sparapany ............ C02F 1/5272
                                                                210/735
5,500,133 A * 3/1996 Carey ....................... C02F 1/56
                                                                210/729
(Continued)

FOREIGN PATENT DOCUMENTS

CN           1335269 A      2/2002

OTHER PUBLICATIONS

Hart, Paul R., The Development and Application of Dithiocarbamate (DTC) Chemistries for Use as Flocculants by North Sea Operators, Baker Petrolite, Sugar Land, Texas (Chemistry in the Oil Industry VII), Royal Society of Chemistry (2002), 280, pp. 149-162.

(Continued)

*Primary Examiner* — Peter Keyworth
(74) *Attorney, Agent, or Firm* — Stinson LLP (57) ABSTRACT

The present invention relates to a process for the treatment of water from the production well of chemical enhanced oil recovery (CEOR) extraction. In particular, the process relates to the treatment of produced water with a combination of reagents to clarify the water, the reagents being selected from (i) a dithiocarbamate polymer which is water-soluble and has a molecular weight of 00 or more and (ii) a metal ion selected from the group comprising a cation of a transition metal, aluminium and lead, and an apparatus therefor. The use of such reagents in the clarification of produced water from polymer flood from chemical enhanced oil recovery is also disclosed.

14 Claims, 4 Drawing Sheets

(51) Int. Cl.
*C02F 1/24* (2006.01)
*C02F 1/38* (2006.01)
*C02F 1/52* (2006.01)
*C08G 73/02* (2006.01)
*C09K 8/588* (2006.01)
*C02F 101/32* (2006.01)
*C02F 103/10* (2006.01)
*C08G 69/26* (2006.01)
*E21B 43/16* (2006.01)

(52) U.S. Cl.
CPC ............ *C02F 1/68* (2013.01); *C08G 73/0246* (2013.01); *C09K 8/588* (2013.01); *C02F 2101/325* (2013.01); *C02F 2103/10* (2013.01); *C08G 69/26* (2013.01); *C08G 73/0206* (2013.01); *E21B 43/16* (2013.01)

(56) References Cited

U.S. PATENT DOCUMENTS

| | | | | |
|---|---|---|---|---|
| 6,238,546 | B1 * | 5/2001 | Knieper | C02F 1/46104 204/269 |
| 2008/0283470 | A1 | 11/2008 | Gustafsson et al. | |
| 2014/0102986 | A1 | 4/2014 | Masciola et al. | |
| 2014/0124452 | A1 * | 5/2014 | Walterick, Jr. | C02F 1/5263 210/703 |
| 2014/0224733 | A1 * | 8/2014 | Osness | C02F 1/54 210/638 |

OTHER PUBLICATIONS

Zhebin, Cai et al., Study on the flocculation performance of new oilfield wastewater treatment agent CJ-1 (Abstract only), (College of Chemistry and Environmental Engineering, Yangtze University, China) Industrial Water Treatment, vol. 32, No. 2 (Feb. 2012), pp. 73-76.

Gao, Yue et al., Treatment of Simulated Produced Wastewater from Polymer Flooding in Oil Production Using Dithiocarbamate-type Flocculant (Abstract only), (Shandong Key Laboratory of Water Pollution Control and Resource Reuse, School of Environmental Science and Engineering, Shandong University, China) Environmental Science, vol. 31, No. 10 (Oct. 2010), pp. 2349-2353.

Gao, Baoyu et al., Performance of dithiocarbamate-type flocculant in treating simulated polymer flooding produced water, (ScienceDirect at www.sciencedirect.com) Journal of Environmental Sciences 2011, 23(1), pp. 37-43.

Li, Li et al., Synthesis and Performance Evaluation of Dithiocarbamate Flocculant (Abstract only), Oilfield Chemistry, vol. 24, No. 1 (Mar. 25, 2007), pp. 48-52.

Gi-Jiang, Ge et al., Oil Removing Mechanism of Dithiocarbamate and Effect of pH of Wastewater (Abstract only), Chinese Journal of Applied Chemistry, vol. 19, No. 12 (Dec. 2002), pp. 1170-1173.

Ji-Jiang, Ge et al., Mechanism of Dithiocarbamates Removing Oil From Waste Water of Oil Field (Abstract only), Acta Petrolei Sinica (2002), 18(5), pp. 1-8.

Ji-Jiang, Ge et al., The Performance of Oil Remover Using Dithiocarbamates (Abstract only), Environmental Chemistry, vol. 21, No. 2 (Mar. 2002), pp. 162-166.

Ji-Jiang, Ge et al., Dithiocarbamates for Use in Oil Production: A Review (Abstract only), Oilfield Chemistry, vol. 17, No. 1 (Mar. 25, 2000), pp. 90-92.

Li-Hui, Song et al, Dithiocarbamate Water-Cleaning Agent DTC-1 for Oilfield Produced Waters (Abstract only), Oilfield Chemistry, vol. 15, No. 2 (Jun. 1998), pp. 171-172.

Author Unknown, New chemical improves produced water treatment, Baker Petrolite, World Oil (Jul. 1998), vol. 219, No. 7, (3 pages).

Durham, D.K. et al., Advances in Water Clarifier Chemistry for Treatment of Produced Water on Gulf of Mexico and North Sea Offshore Production Facilities, Society of Petroleum Engineers 26008 (Mar. 1993), pp. 615-622.

Durham, D.K., New Water Clarifiers for Treating Produced Water on North Sea Production Platforms, Recent Advances in Oilfield Chemistry, (Apr. 1994), pp. 311-316.

* cited by examiner

(i)　　　　(ii)　　　　(iii)　　　　(iv)　　　　(v)　　　　(vi)

(i)　　　　(ii)　　　　(iii)　　　　(iv)　　　　(v)

Fig. 5

(i)　　　　(ii)　　　　(iii)　　　　(iv)　　　　(v)　　　　(vi)

PROCESS FOR THE TREATMENT OF PRODUCED WATER FROM CHEMICAL ENHANCED OIL RECOVERY

FIELD OF THE INVENTION

The present invention relates to a process for the treatment of water from the production well of chemical enhanced oil recovery (CEOR) extraction. In particular, the process relates to the treatment of produced water with a combination of reagents to clarify the water. The use of such reagents in the clarification of produced water from polymer flood from chemical enhanced oil recovery is also disclosed, together with an apparatus therefor.

BACKGROUND OF THE INVENTION

Enhanced oil recovery relates to techniques used to increase the amount of crude oil which can be extracted from an oil reservoir to improve well production. Such techniques include the injection of heat or fluids to improve mobility of oil within the reservoir. For instance, heating the crude oil may reduce its viscosity, while fluids may be used to reduce interfacial or surface tension.

Chemical enhanced oil recovery (CEOR) introduces chemicals into a subsurface oil reservoir from an injection well and extracts the crude oil and injected chemicals from the subsurface oil reservoir via a production well. The chemicals are normally introduced into the injection well in a liquid, typically water.

The chemical may perform one or more functions. For instance, when the chemical includes a polymer, it may increase the viscosity of injected water to enable a better sweep of the reservoir formation to increase oil production. This is referred to as polymer flooding and can be used when the heterogeneity of the reservoir is high or when the waterflood mobility ratio is high. Oil recovery increases as the mobility ratio decreases. When the chemical is a surfactant, it may lower the interfacial tension of oil droplets improving their mobility through the reservoir and/or lower the surface tension between oil and water improving the efficiency of the extraction process. A surfactant may be applied as primary surfactant, accompanied with co-surfactants and co-solvents added to improve stability of the formulation. When the chemical is an alkaline agent it may lower the surface tension, reverse the rock wettability, emulsify the oil, mobilize the oil and help in drawing the oil out of the rock. Such surfactants and alkaline agent may be used in combination with a polymer in polymer flooding.

Typically, the polymer used in chemical enhanced oil recovery is an anionic polymer. Such anionic polymers provide steric and charge repulsion effects which stabilise the crude oil droplets, with the drawback of making the crude oil more difficult to separate from the fluid extracted from the production well, which is referred to as polymer flood.

After extraction from the production well, bulk separation of the polymer flood is carried out to provide recovered crude oil and produced water. The produced water contains the CEOR polymer and any other chemical additives, together with residual oil which was not removed in the bulk separation step. In order to render the produced water suitable for further use or discharge, it is treated with cationic coagulants and/or water clarifiers to neutralise the anionic polymer and separate it and the residual oil from the water.

Colloids and Surfaces A: Physiocochem. Eng. Aspects. 252 (2004), 113-119 discloses an investigation of the destabilisation of oil droplets in produced water from polymer flooding by Deng et al. Such produced water was found to be difficult to treat because of the large quantities of residual chemicals in the produced water. Flocculation and demulsification techniques were analysed to remove the stable oil droplets from the produced water. Flocculant treatment was found to require a high concentration of flocculant, which may be uneconomic due to the high cost of the flocculant. In addition, viscous sediments were found to form by the reaction of the flocculant with the anionic polymer, hindering oil recovery. As an alternative, water-soluble and oil-soluble demulsifiers were screened, with an oil-soluble demulsifier being found to be most suitable.

A need exists to provide an improved process for the treatment of the produced water to separate CEOR polymer and oil from the water. For instance, the process should provide clarified water with a low residual oil content. Furthermore, in order to minimise environmental impact, the process may preferably utilise low concentrations of reagents in the separation.

SUMMARY OF THE INVENTION

In a first aspect, the present invention provides a process for the treatment of produced water from polymer flood chemical enhanced oil recovery, said process comprising at least the steps of:
  providing produced water comprising water, an anionic polymer and oil;
  first treating the produced water with a first reagent to provide first treated produced water;
  second treating the first treated produced water with a second reagent to provide second treated produced water comprising water and agglomerates comprising oil, anionic polymer, first reagent and second reagent; and
  separating the water and agglomerates of the second treated produced water to provide treated water and separated agglomerates;
  wherein, the first and second reagents are selected from:
  a metal ion selected from the group comprising a cation of a transition metal, aluminium and lead; and
  a dithiocarbamate polymer which is water-soluble and has a molecular weight of 500 or more,
  such that one of the first and second reagents comprises the metal ion and the other reagent comprises the dithiocarbamate polymer.

The process of the present invention clarifies the produced water, such that the treated water comprises a lower concentration of oil and anionic polymer compared to the produced water. In one embodiment, the treated water comprises <100 mg/L oil in water, such as <50 mg/L oil in water. In another embodiment, the treated water comprises <29 mg/L oil in water. A limit of 29 mg/L is a typical overboard disposal limit set by some government agencies for the disposal of effluent water into the North Sea.

In another embodiment, the produced water may further comprise other chemical enhanced oil recovery agents, such as one or more of those selected from the group comprising surfactants, such as primary surfactants and co-surfactants and co-solvents.

In one embodiment, the anionic polymer is one or more polymers selected from the group comprising hydrolysed polyacrylamide and polysaccharides.

In another embodiment, the first reagent is a metal ion selected from the group comprising cations of a transition metal, aluminium and lead and the second reagent is a dithiocarbamate polymer.

In an alternative embodiment, the first reagent is a dithiocarbamate polymer and the second reagent is a metal ion selected from the group comprising cations of a transition metal, aluminium and lead. This sequence of addition can provide improved oil separation compared to the addition of the dithiocarbamate polymer after the addition of the metal ion.

In another embodiment, the first and second reagents are different. For instance, if one reagent comprises a metal ion selected from the group comprising a cation of a transition metal, aluminium and lead, then it does not comprise a dithiocarbamate polymer. Similarly, if one reagent comprises a dithiocarbamate polymer, it does not comprise a metal ion selected from the group comprising a cation of a transition metal, aluminium and lead.

In another embodiment, the first and second reagents are added separately. Typically, the first treating and second treating steps are separated by a period of time of at least 30 seconds, preferably at least 2 minutes and more preferably at least 10 minutes. Thus, the second treatment may not be carried out to the first treated produced water for at least 30 second from formation of the first treated produced water, preferably at least 2 minutes from formation and more preferably at least 10 minutes from formation. The first and second reagents should not be added simultaneously because they will immediately react together and coagulate.

In another embodiment, the first and second reagents may each independently be in a concentration of from 1 to 1000 ppm, preferably 10 to 500 ppm, more preferably 10 to 100 ppm in the stream to which they are added.

The metal ion used as the first or second reagent may be one or more ions selected from the group comprising a cation of a transition metal, a cation of aluminium and a cation of lead. In one embodiment, a single type of cation is present as the metal ion reagent. In another embodiment, one or more cations of a transition metal may be present in combination with one or both of a cation of aluminium and a cation of lead. In another embodiment, at least two cations of different transition metals may be present, either with or without a cation of aluminium and/or a cation of lead.

Preferably, the cation of aluminium is in the +3 oxidation state. For instance, the cation of aluminium may be Al(III) i.e. $Al^{3+}$.

Other cations may be in the +2 oxidation state. For instance, the cation of lead may be Pb(II) i.e. $Pb^{2+}$. Similarly, the cation of a transition metal may one or more selected from the group comprising Hg(II), Cd(II), Cu(II), Zn(II), Co(II), Ni, Fe(II) and Mn(II). Other transition metal cations, such as the cation of silver, may be Ag(I) i.e. $Ag^+$.

Preferably, the metal ion comprises one or more cations of a transition metal.

In a further embodiment, the one or more cations of a transition metal may be one or more selected from group 7 to group 12 of the periodic table.

Preferably, the cation of a transition metal is one or more selected from the group comprising Hg(II), Ag(I), Cd(II), Cu(II), Zn(II), Co(II), Ni, Fe(II) and Mn(II). More preferably, the metal ion comprises Fe(II) i.e. $Fe^{2+}$.

The metal ion is typically present in the reagent in the form of a water-soluble salt. Thus, the metal ion is present with an anionic counter-ion. Examples of such anionic counter-ions for water-soluble metal ion salts are organic and inorganic anions, such as nitrate, sulphate, phosphate, halides such as $Cl^-$ and the like. For instance, when metal ion comprises Fe(II), the reagent may comprise a Fe(II) salt, such as ferric sulphate.

The dithiocarbamate polymer used as the first or second reagent may comprise one or both of a dithiocarbamate group and a dithiocarbamate salt group. Preferably, the dithiocarbamate polymer comprises at least 5 dithiocarbamate and/or dithiocarbamate salt groups.

In one embodiment, the dithiocarbamate polymer has a molecular weight of greater than or equal to 1000, preferably greater than or equal to 1500, still more preferably in a range from 1500 to 5000.

The dithiocarbamate polymer is water soluble. A dithiocarbamate polymer may be rendered water-soluble due to modification of one or more substituent groups. For instance, the presence of dithiocarbamate salt groups can increase the aqueous solubility of the polymer. Thus, in one embodiment, the dithiocarbamate polymer is water-soluble because a portion or all of the dithiocarbamate groups are dithiocarbamate salt groups. The dithiocarbamate polymer may be modified with carbon disulfide, for instance by the reaction of NH-containing groups on the dithiocarbamate polymer with carbon disulphide. This procedure can be used to render polyethyleneimine polymers water-soluble for use as a reagent in the present invention. This functional group substitution is especially effective where the molecular weight of the polymer is about 10,000 or less. Typically, the amount of carbon disulfide which may be used to impart water-solubility in such a molecular weight range is 25 mole % or less per mole of NH-containing groups, although higher concentrations may be used. Alternatively, other functional groups may be present in the dithiocarbamate polymer to render it water-soluble. Polar functional groups are particularly preferred, such as carbonyl and hydroxyl groups, particularly carboxylic acids groups or their salts, amines, amides etc.

In a preferred embodiment, the dithiocarbamate polymer contains NH-groups of which from 5 to 50 mole % are converted to dithiocarbamate groups and/or dithiocarbamate salt groups, more preferably in the range of 20 to 40 mole %, still more preferably in the range of 25 to 30 mole %. The dithiocarbamate groups and/or dithiocarbamate salt groups are preferably present as dithiocarbamate salt groups.

In another embodiment, the dithiocarbamate polymer has a sulphur content in the range of from 40 to 60 wt. %, based upon the total weight of the polymer.

The dithiocarbamate groups on the dithiocarbamate polymer may be one or both of N-substituted carbodithio (—C(=S)—S—) groups i.e. dithiocarbamate groups and N-substituted carbodithioate (—$CS_2^-$) groups i.e. dithiocarbamate salt groups, the latter imparting water solubility to the polymer. In the N-substituted carbodithio group —C(=S)—S—R', R' may be hydrogen or a $C_{1-5}$ alkyl group. The N-substituted carbodithioate group —$CS_2^-$ is charge balanced by a cationic counter-ion, $X^{n+}$ in which n is 1 or 2. The cationic counter-ion $X^{n+}$ may be selected from the group comprising an alkali metal ion of oxidation state (I), an alkaline earth metal ion of oxidation state (II) and a quaternary amine, such as a cation of formula $NR''_4^+$ in which each substituent R" is independently selected from H and $C_{1-5}$ alkyl.

The dithiocarbamate polymer may comprise a dithiocarbamate polyamine polymer. For instance, the dithiocarbamate polyamine polymer may comprise a polyamine polymer N-substituted with one or both of carbodithio (—C(=S)—S—) and carbodithioate (—$CS_2^-$) groups. The polyamine polymer may be completely or partially N-substituted with carbodithio and/or carbodithioate groups. Preferably, from 5 to 100 mole % of the amine groups on the polymer are converted to dithiocarbamate and/or dithiocarbamate salt groups, more preferably from 5 to 50 mole %, still more preferably from 20 to 40 mole %, most preferably in the range of 25 to 30 mole % are converted to dithiocarbamate groups and/or dithiocarbamate salt groups.

Preferably, the dithiocarbamate polyamine polymer is dithiocarbamate polyethylenimine i.e. polyethylenimine which has been completely or partially N-substituted with carbodithio and/or carbodithioate groups, more preferably completely or partially N-substituted with carbodithioate groups i.e. dithiocarbamate salt groups. Preferably, from 5 to 50 mole % of the primary or secondary amine groups on the polyethylenimine polymer, more preferably from 10 to 25 mole %, are converted to dithiocarbamate groups/or dithiocarbamate salt groups.

Such dithiocarbamate polyamine polymers may be prepared from the reaction of ethylene dichloride and ammonia. Such polyamine polymers may have a molecular weight in the range of from 500 to 10,000 with a preferred molecular weight in the range of from 1,500 to 10,000 and a more preferred molecular weight range of from 1,500 to 5,000.

In another embodiment, the dithiocarbamate polymer may comprise a dithiocarbamate polyimide polymer. For instance, the dithiocarbamate polyimine polymer may comprise a polyimine polymer N-substituted with one or both of carbodithio (—C(=S)—S—) and carbodithioate (—$CS_2^-$) groups. The polyimine polymer may be completely or partially N-substituted with carbodithio and/or carbodithioate groups. Preferably, from 5 to 50 mole % of the nitrogen groups on the polyimine polymer, more preferably from 10 to 25 mole %, are substituted with carbodithio and/or carbodithioate groups.

The polyimide polymer may have a molecular weight in the range of from 500 to 10,000 with a preferred molecular weight in the range of from 1,500 to 5,000.

In another embodiment, the dithiocarbamate polymer may comprise a copolymer of an acrylic-OH or an acrylic-$OR^4$ monomer and a polyamine monomer in which $R^4$ is a hydrocarbon group having from 1 to 10 carbon atoms or a $NHR^5$ group or $OR^4$ together is a salt of a hydroxyl group.

The molecular weight of the dithiocarbamate polymer comprising a copolymer of an acrylic-OH or an acrylic-$OR^4$ monomer and a polyamine monomer may be from 500 to 200,000, preferably from 1,500 to 8,000, more preferably from 1,500 to 5,000.

The copolymer can then be modified to contain dithiocarbamate groups, including dithiocarbamate salt groups. The dithiocarbamate polymer may comprise from 5 to 100 mole %, preferably from 25 to 90 mole %, more preferably from 55 to 80 mole % of the amine groups in the unmodified copolymer are converted to dithiocarbamate groups and/or dithiocarbamate salt groups.

In another embodiment, the dithiocarbamate polymer is added in an amount of 0.9 to 2.5 mole equivalents based upon the metal ion.

In another embodiment, the separating step comprises mechanically separating the second treated produced water. Preferably, the mechanical separation is carried out using one or more of a hydrocyclone, a corrugated plate interceptor, a compact flotation unit and a gas flotation unit, such as an induced gas flotation unit or a dissolved gas flotation unit.

In another embodiment, the process further comprises, between the first and second treating steps, an intermediate separating step of:
separating a portion of the oil from the first treated produced water.

Typically, a portion of the anionic polymer is also removed with the oil, such that the step comprises separating a portion of the oil and anionic polymer from the first treated produced water.

Preferably, the intermediate separation step is carried out using a hydrocyclone. More preferably, the operation of the hydrocyclone is improved by the addition of gas bubbles, for instance by the addition of dissolved or induced air into the first treated produced water. The hydrocyclone uses cyclonic forces to coalesce particles into a size that can be removed, for instance it can remove oil droplets with a diameter of 20 micrometers or greater.

In another embodiment, the produced water may be provided by the steps of:
providing a polymer flood from a production well, said polymer flood comprising water, an anionic polymer and crude oil; and
separating the polymer flood to provide recovered crude oil and the produced water comprising water, an anionic polymer and oil as residual oil.

In a second aspect, the present invention provides the use of i) a metal ion selected from the group comprising cations of a transition metal ion and lead and ii) a dithiocarbamate polymer as reagents in the clarification of produced water from polymer flood from chemical enhanced oil recovery.

In a third aspect, the present invention provides an apparatus for the treatment of produced water from polymer flood chemical enhanced oil recovery, said apparatus comprising at least:
a produced water feed line for a produced water stream;
a first reagent feed line for a first reagent stream connected at a first reagent injection point to the produced water feed line, said first reagent line in fluid communication with a first reagent storage tank;
a first treated produced water line for a first treated produced water stream in fluid connection with the produced water feed line and located downstream of the first reagent injection point;
a second reagent feed line for a second reagent stream connected at a second reagent injection point to the first treated produced water line, said second reagent line in fluid communication with a second reagent storage tank;
a second treated produced water line for a second treated produced water stream in fluid connection with the first treated produced water line and located downstream of the second reagent injection point;
a second treated produced water separation device having an inlet connected to the second treated produced water line and a first outlet for a treated water line and a second outlet for a second treated agglomerate line.

In one embodiment of the apparatus, the first reagent storage tank comprises a first reagent and the second reagent storage tank comprises a second reagent and the first and second reagents are selected from:
a metal ion selected from the group comprising a cation of a transition metal, aluminium and lead; and
a dithiocarbamate polymer,
such that one of the first and second reagents comprises the metal ion and the other reagent comprises the dithiocarbamate polymer.

In another embodiment, the apparatus further comprises:
an intermediate treated produced water separation device, said intermediate treated produced water separation device having a first inlet for the first treated produced water line and a first outlet in fluid communication with the second treated produced water line and located between the first reagent injection point and the second reagent injection point and a second outlet for a first treated agglomerate line.

In another embodiment, the apparatus further comprises:
a polymer flood line for a polymer flood stream from a production well;
a polymer flood separation device having an inlet connected to the polymer flood line, a first outlet connected to the produced water feed line and a second outlet connected to a recovered crude oil line for a recovered crude oil stream.

FIGURES

In order to further explain the present invention and its advantages, a more detailed description is provided with reference to the embodiments below which are illustrated by the following Figures. It should be appreciated that these Figures relate to typical embodiments of the invention and their advantages, and are therefore not to be considered as limiting the scope of the invention, which is defined by the appended claims.

FIG. 6A shows that of an untreated brine solution which mimics North Sea produced water, while FIG. 6B shows the image of a flocculated particle after the addition of dithiocarbamate and ferric sulphate.

DETAILED DESCRIPTION

The present invention provides a process for the treatment of produced water from polymer flood chemical enhanced oil recovery. The produced water is obtained from the polymer flood extracted from the production well after an initial separation of the crude oil component. Typically, the initial separation of the crude oil component from the polymer flood is not completely effective, particularly because the agents used in chemical enhanced oil recovery such as anionic polymer, primary surfactant, co-surfactant and other additives stabilise the crude oil droplets in the polymer flood, making separation difficult.

The treatment process disclosed herein clarifies the produced water containing the polymer CEOR agent and residual crude oil in order to form agglomerates comprising the anionic polymer and crude oil. These agglomerates can then be removed in a separation step to provide treated water. The treated water may then find further use, or may have a sufficiently low oil in water content, such as <29 mg/L, rendering it acceptable for discharge.

Various further aspects and embodiments of the present invention will be apparent to those skilled in the art in view of the present disclosure.

As used herein, the term "crude oil" is defined as an unprocessed, naturally occurring composition of hydrocarbons and other organic compounds found in subsurface geological formations. It is used synonymously with the term "unprocessed petroleum".

The term "mobility" is the permeability of a fluid divided by its viscosity. The ratio in a waterflood is the mobility of water divided by the mobility of oil.

As used herein, the term "anionic polymer", which is present in the polymer flood and produced water as a chemical enhanced oil recovery agent, comprises a polymer chain having groups capable of anionic functionality attached thereto. The groups capable of anionic functionality may form part of the polymer chain itself, or may be attached to the polymer chain as pendent groups. In solution, the groups capable of anionic functionality disassociate into anionic groups attached to the polymer chain, such that the polymer chain has a net negative charge, and free cationic counterions. In this way, the anionic polymer can provide steric and charge repulsion effects which stabilise the crude oil droplets in solution.

Typically, the anionic polymer may be a polyacrylamide derivative, particularly a hydrolysed polyacrylamide (HPAM) in which a portion of the amide groups (—C(═O)NH$_2$) have been hydrolysed to carboxyl groups (—C(═O)OH), which will dissociate to form anionic carboxylate groups (—C(═O)O$^-$) attached to the polymer chain in aqueous solution. The degree of hydrolysis of the amide groups will affect the properties of the polymer, such as water solubility, viscosity and retention in the oil reservoir. Typically, from 30 to 35% of the acrylate monomer units forming the polyacrylate can be hydrolysed. This provides an anionic polymer which is water soluble but which is relatively insensitive to water salinity and hardness, rendering it effective as a polymer which can be used as an agent in chemical enhanced oil recovery. Such anionic polymers may have a molecular weight in the range of from 5,000,000 to 20,000,000 DA. The molecular weight of the anionic polymer is one factor which determines the viscosity of the injected chemical composition in CEOR, the selection of which will be determined by the properties of the formation from which the oil is to be removed.

Alternatively, the anionic polymer may be a polysaccharide, which can, for instance, be formed by fermentation. The polysaccharide should comprise carboxyl or carboxylate groups. Such groups can impart a negative charge to the polymer chain in solution. Such anionic polymers may have a molecular weight in the range of from 2,000,000 to 5,000,000 DA.

Given the anionic nature of the polymer chain, it would not be expected that such polymers would agglomerate with an anionically charged reagent.

As used herein, the term "soluble" when used in relation to a compound, such as a water-soluble dithiocarbamate polymer or a water-soluble salt, means that at least 1 part by weight of a compound is soluble in 100 parts by weight of solvent. Preferably, at least 1 part by weight of a compound is soluble in 10 parts by weight of solvent.

As used herein, a "dithiocarbamate polymer" is a polymer comprising one or both of dithiocarbamate groups and dithiocarbamate salt groups. These groups are covalently attached to the polymer. A dithiocarbamate group is an analogue of the carbamate group (>N—C(=O)—O—) in which both oxygen atoms have been replaced with sulphur atoms i.e. a group of formula >N—C(=S)—S.

A dithiocarbamate group may be converted into a dithiocarbamate salt group by reaction with a base such as a base selected from the group comprising an alkali metal hydroxide, an alkaline earth metal hydroxide and an ammonium hydroxide, including primary-, secondary- and tertiary-substituted ammonium hydroxide. Preferably, dithiocarbamate salt groups are preferred.

The dithiocarbamate polymer used as the first or second reagent may be prepared by the reaction of an amine, including a polyamine or polyimide, with carbon disulphide. Thus, a polyamine or polyimide polymer may be prepared and subsequently reacted with carbon disulphide to provide a dithiocarbamate polymer.

Alternatively, the dithiocarbamate polymer can be prepared by the reaction of a dihalohydrocarbyl with ammonia and carbon disulphide in a pressure reactor. The reaction may be carried out in a solvent, such as water or an alcohol. The reaction may be carried out at a temperature in the range of from 30 to 100° C., preferably 40 to 70° C. The reaction time may be from 1 to 10 hours, preferably from 2 to 5 hours.

Reaction of a dithiocarbamate polymer having dithiocarbamate groups with a base, such as those described above, preferably in aqueous solution, will convert a dithiocarbamate group into a dithiocarbamate salt group.

The proportion of the dithiocarbamate groups and/or dithiocarbamate salt groups in the dithiocarbamate polymer may be expressed in terms of mole % or weight % carbon disulphide used in the synthesis.

The dithiocarbamate polymer may be straight-chain or branched.

A straight-chain polyamine may be prepared by the reaction of a dihaloalkyl, particularly an a, w-dihaloalkyl, for instance 1,2-dichloroethane, with ammonia. Thus, the polyamine may have the structural formula:

$$H_2N—(R^1NH)_a—R^1—NH_2$$

in which $R^1$ is a divalent hydrocarbon group having from 1 to 10 carbon atoms and a is an integer from 0 to 20, preferably from 0 to 5. The $R^1$ group may be straight-chained, branched or cyclic. Examples of suitable $R^1$ groups are a $C_{1-10}$ alkylene, $C_{2-10}$ alkenylene, $C_{2-10}$ alkynylene and $C_{4-10}$ arylene group. Preferably, the $R^1$ group may be a $C_{1-5}$ alkyl or a $C_{4-10}$ arylene group. The $R^1$ $C_{4-10}$ arylene group may be a heteroaryl group in which from 1 to 3 of the aromatic ring carbon atoms are independently substituted with one or more heteroatoms selected from O, S and N. For instance, when $R^1$ is ethylene, the polyamine is a polyethylenimine. Examples of suitable polymers and syntheses can be found in U.S. Pat. No. 5,164,095.

The copolymer can then be modified to contain dithiocarbamate groups, including dithiocarbamate salt groups. The polymer may comprise from 5 to 100 mole %, preferably from 25 to 90 mole %, more preferably from 55 to 80 mole % of the amine groups in the unmodified polymer converted to dithiocarbamate groups or dithiocarbamate salt groups.

In another embodiment, the dithiocarbamate polymer may comprise a copolymer of an acrylic-OH or an acrylic-$OR^4$ monomer and a polyamine monomer in which $R^4$ is a hydrocarbon group having from 1 to 10 carbon atoms or a $NHR^5$ group or $OR^4$ together is a salt of a hydroxyl group. When $OR^4$ together is a salt of a hydroxyl group, $R^4$ may be a cationic counterion, such as a cation selected from the group comprising an alkali metal ion of oxidation state (I), an alkaline earth metal ion of oxidation state (II) and a quaternary amine, such as a cation of formula $NR''_4^+$ in which each substituent R" is independently selected from H and $C_{1-5}$ alkyl. The $R^4$ and $R^5$ groups may be independently straight-chained, branched or cyclic. Examples of suitable $R^4$ groups are a $C_{1-10}$ alkyl, $C_{2-10}$ alkenyl, $C_{2-10}$ alkynyl and $C_{4-10}$ arylene group. Preferred $R^4$ groups are a $C_{1-5}$ alkyl and $C_{4-10}$ arylene group. The $R^4$ $C_{4-10}$ arylene group may be a heteroaryl group in which from 1 to 3 of the aromatic ring carbon atoms are independently substituted with one or more heteroatoms selected from O, S and N. The $R^5$ group may be a $C_{1-5}$ alkyl group.

The molecular weight of the dithiocarbamate polymer comprising a copolymer of an acrylic-OH or an acrylic-$OR^4$ monomer and a polyamine monomer may be from 500 to 200,000, preferably from 1500 to 8000.

Preferably, the polymer may be obtained by the reaction between an acrylic-OH or acrylic-$OR^4$ monomer, such as an acrylic amide, acrylic acid or salts thereof, and an alkylamine monomer such as pentaethylene hexamine (PEHA), tetraethylene pentamine (TEPA), diethylene triamine (DETA), triethylene tetraamine (TETA) or ethylene diamine (EDA). The molar ration of the acrylic-OH or acrylic $OR^4$ monomer to alkylamine may be from 0.85 to 1.5.

Preferably, the acrylic-OH or acrylic-$OR^4$ monomer may be selected from the group comprising methyl acrylate, methyl methacrylate, ethyl acrylate, ethyl methacrylate, propyl acrylate, propyl methacrylate, acrylic acid and salts thereof, methacrylic acid and salts thereof, acrylamide and methacrylamide.

The copolymer can then be modified to contain dithiocarbamate groups, including dithiocarbamate salt groups. The dithiocarbamate polymer may comprise from 5 to 100 mole %, preferably from 25 to 90 mole %, more preferably from 55 to 80 mole % of the amine groups in the unmodified polymer converted to dithiocarbamate groups and/or dithiocarbamate salt groups.

A polyimide may be prepared by the reaction of a dianhydride and a diamine or a diisocyanate. Thus, the polyimide may have the structural formula:

$$H_2N—(R^2N(H)C(=O)R^3C(=O)N(H)—)_bR^2NH_2$$

in which $R^2$ and $R^3$ are independently divalent hydrocarbon groups having from 1 to 10 carbon atoms and b is an integer from 1 to 20, preferably 1 to 6. The $R^2$ and $R^3$ groups may be independently straight-chained, branched or cyclic. Examples of suitable $R^2$ and $R^3$ groups are those independently selected from the group comprising a $C_{1-10}$ alkylene, $C_{2-10}$ alkenylene, $C_{2-10}$ alkynylene and $C_{4-10}$ arylene group. The $R^2$ and $R^3$ groups are preferably independently selected from a $C_{1-5}$ alkylene and $C_{4-10}$ arylene group. The $R^2$ and $R^3$ $C_{4-10}$ arylene groups may be a heteroaryl group in which from 1 to 3 of the aromatic ring carbon atoms are independently substituted with one or more heteroatoms selected from O, S and N. It will be apparent that the $R^2$ group derives from the diamine or diisocyanate while the $R^3$ group derives from the dianhydride.

It will be apparent that one of more of the nitrogen-bonded hydrogen atoms in the above polymers can be substituted with a carbodithio and/or a carbodithioate group to provide a dithiocarbamate polymer. The polymer may comprise from 5 to 100 mole %, preferably from 25 to 90 mole %, more preferably from 55 to 80 mole % of the amine groups in the unmodified polymer converted to dithiocarbamate groups or dithiocarbamate salt groups.

Further N-substitutions may be carried out as long as at least a portion of the nitrogen atoms are N-substituted with carbodithio and/or carbodithioate groups. For instance, N-substitution with $C_{1-10}$ alkyl groups, β-hydroxy $C_{1-10}$alkyl groups, $C_{1-10}$acyl groups etc. are also encompassed by the present invention. These can be obtained by reacting alkyl halides, epoxyalkanes and fatty acid derivatives with the polyamine having the above structural formula.

Preferred dithiocarbamate polymers are those sold under the NALMET® trademark by Nalco, an Ecolab Company.

Certain aspects and embodiments of the invention will now be illustrated by way of example and with reference to the figures described above and the following tables.

Figure 1:
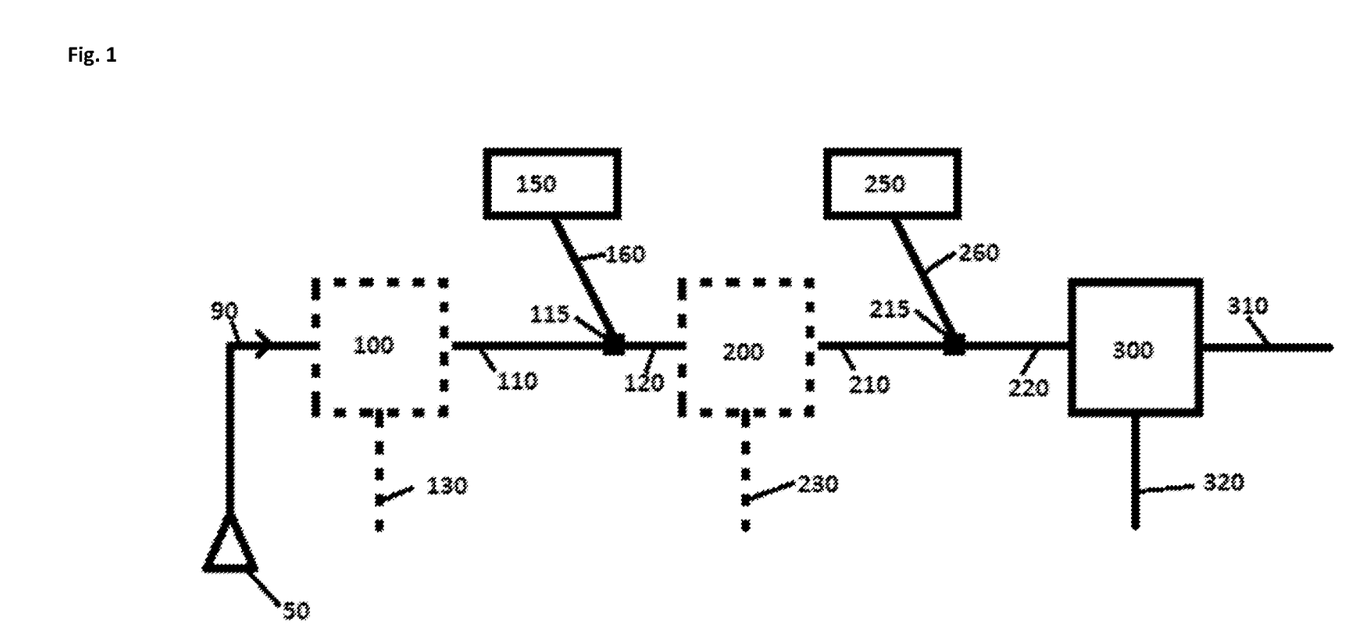
FIG. 1 shows a schematic representation of an apparatus 10 which can be used in the process described herein.

FIG. 1 shows a schematic representation of an apparatus 10 for use with the process described herein. In a polymer flood enhanced oil recovery, a polymer aqueous solution is injected into an injection well which is in fluid communication with a subsurface oil reservoir. In the process described herein, the polymer is an anionic polymer. The polymer aqueous solution may further comprise one or more other additives, such as surfactants, such as a primary and co-surfactant(s), and co-solvents. Examples of such co-solvents are alcohols having from 1 to 10 carbon atoms, such as propanol and hexanol.

The polymer increases the viscosity of the injected water, improving the oil to water mobility ratio and expands the volume of the displacement liquid in the oil reservoir to enhance recovery. The crude oil is extracted from the oil reservoir in an extraction well. The extraction well is in fluid communication with the oil reservoir and is located apart from the injection well in order to allow the polymer aqueous solution to sweep through the oil reservoir from injection to extraction point.

The crude oil extracted from the oil reservoir as a polymer flood. The polymer flood comprises crude oil, water and the anionic polymer enhanced oil recovery agent. The polymer flood may further comprise any of the other additives present in the polymer aqueous solution discussed above i.e. one or more other additives selected from the group comprising surfactants and co-solvents. The polymer flood is typically in the form of a polymer stabilised reverse emulsion i.e. a polymer stabilised oil-in-water emulsion.

Returning to FIG. 1, the scheme shows an extraction well 50, which provides a polymer flood stream 90. The polymer flood stream 90 can be passed to an inlet of a polymer flood separation device 100. Typically, when the polymer flood is an emulsion, it is broken into crude oil and water phases. The emulsion possess a degree of kinetic stability which arises from the interfacial films which encapsulate the oil droplets. The disruption of these interfacial films allows the oil droplets to coalesce. The emulsion can be broken by a variety of means, such as the application of heat, shear, the removal of solids which may stabilise the emulsion, etc. The polymer flood separation device may therefore be a two-phase emulsion separator, such as those conventionally known. If the polymer flood further comprises gaseous components, such as methane or other gaseous hydrocarbons, a three-phase emulsion separator allowing for the separation of the gaseous components may be employed. Emulsion separators may comprise one or more of a heater section, mixer section, filter section and coalescing section. The polymer flood separation device 100 may also be a settling tank. Separation of the crude oil and water phases allows the removal of the oil phase from an outlet of the polymer flood separation device 100 as a recovered crude oil stream 130. The water phase may be removed from an outlet as produced water stream 110.

The produced water stream 110 comprises water, anionic polymer and residual crude oil. The produced water may comprise greater than 50 ppm anionic polymer. The produced water stream may further comprise one or more other additives present in the polymer aqueous solution originally injected, such as one or more selected from the group comprising surfactants and co-solvents. Typically, the other additives present in the produced water stream are hydrophilic additives.

In order to clarify the produced water to reduce the concentration of residual oil and anionic polymer, the produced water is treated with first and second reagents. The process described with respect to FIG. 1 is a continuous process. However, the first and second reagents could also be added in a batch-wise process, as discussed in the experimental section below.

A first reagent injection point 115 is located in the produced water stream 110 downstream of the polymer flood separation device 100. The first reagent injection point 115 connects the produced water stream 110 to a first reagent stream 160, which is supplied from, and is in fluid connection with, a first reagent storage tank 150. The first reagent is normally supplied as part of a liquid mixture, preferably a solution of the first reagent in water.

The addition of the first reagent to the produced water stream 110 is the first of two addition steps resulting in the clarification of the produced water stream to remove at least a portion of the anionic polymer and residual crude oil.

The first reagent is selected from i) a metal ion selected from the group comprising a cation of a transition metal and lead and ii) a dithiocarbamate polymer. The selection of the first reagent may depend upon the nature of the produced water stream 110. In some embodiments, superior results were obtained when the metal ion was added as the first reagent. In other embodiments, superior results were obtained when the dithiocarbamate polymer was added as the first reagent.

The metal ion may be provided in the form of a water-soluble salt as discussed above which is dissolved in water. Typically, the concentration of the water-soluble salt is in the range of from 10 to 30%, preferably about 20% by weight of the aqueous solution forming the reagent stream 160, 260.

The dithiocarbamate polymer may be provided in the form of an aqueous solution. Typically, the concentration of the water-soluble dithiocarbamate polymer is in the range of from 10 to 30%, preferably about 20% by weight of the aqueous solution forming the reagent stream 160, 260.

It is a straight-forward test to determine the optimal order of addition of the metal ion and dithiocarbamate polymer. Suitable examples for such a determination are provided in the experimental section below. In one experiment, the metal ion can first be added to a sample of the produced water stream and subsequently the dithiocarbamate polymer can be added. Preferably, the second reagent is added after a specified period of time, such as after 30 seconds have elapsed. However, the second reagent can be added up to 10 minutes or more after addition of the first reagent. A second sample can be tested with the addition of the dithiocarbamate polymer first followed by subsequent addition of the metal ion. The addition sequence providing the best clarification of the sample can then be applied to the treatment of the produced water stream.

The addition of the first reagent to the produced water stream 110 produces a first treated produced water stream 120 comprising water, anionic polymer, residual oil, first reagent and any other additives from the CEOR still present in the stream after the initial separation in the polymer flood separation device 100. Typically, the first reagent is added to the produced water stream 110 to provide a concentration of from 10 to 1000 ppm first reagent in the first treated produced water stream 120.

The first treated produced water stream 120 may then be second treated with the second reagent or more preferably, may be passed to an intermediate separation device 200 before the addition of the second reagent. The intermediate separation device 200 can separate a portion of the residual oil and anionic polymer from the first treated produced water stream.

It is preferred that the first reagent is added to the produced water stream 110 sufficiently upstream of the intermediate separation device 200 or the second reagent injection point 215 discussed below if no intermediate separation is to be carried out, to allow mixing of the first reagent with the produced water stream 110. As the contact time between the first reagent and the produced water stream increases, so the overall separation is improved. Typically, the addition of the first reagent to the produced water stream 110 should occur at least 30 seconds, preferably at least 2 minutes, more preferably at least 10 minutes prior to the next treatment step, such as intermediate separation or the addition of the second reagent. Thus, taking account of the flow rate of the produced water stream 110, the first reagent injection point 115 should be located at a point to allow mixing and maximise the interaction of the first reagent with the produced water in the first treated produced water stream 120 prior to the next treatment step.

The metal ion or dithiocarbamate polymer forming the first reagent are both individually capable of forming aggregates of suspended particles in the produced water stream. Thus, a degree of flocculation of oil droplets may occur with the addition of only one of the two reagents to the produced water stream. Consequently, an intermediate separation step may be carried out to remove such flocculated particles. However, it should be noted that the most significant particulate removal occurs in the second treated produced water separation device 300 discussed below, at which time both first and second reagents are present in the produced water.

The intermediate separation device 200 separates a portion of the oil and anionic polymer which is entrained with the oil from the first treated produced water stream 120. Preferably, the intermediate separation device is a hydrocyclone. The hydrocyclone induces cyclonic forces in the first treated produced water which can assist the coalescence of suspended particles by the first agent. These particles can coalesce to a size which allows their removal from the first treated produced water. The coalesced particles may comprise oil, anionic polymer (i.e. a CEOR polymer component) and first reagent. Typically, the hydrocyclone can separate coalesced particles having a diameter of 20 micrometers or greater. The coalesced particles can be removed from the first intermediate separation device 200 as first treated agglomerate stream 230. The first treated agglomerate stream comprises the coalesced particles and water.

The operation of the hydrocyclone can be improved by the generation of gas bubbles in the first treated produced water stream 120. The gas bubbles are preferably air bubbles. The gas bubbles may be produced by the direct injection of air bubbles or by the addition of a water stream comprising dissolved air into the first treated produced water. This injection or addition may be carried out upstream of, or within, the intermediate separation device 200. When water comprising dissolved air is added to the first treated produced water, air bubbles are formed in the hydrocyclone. The presence of the air bubbles facilitates removal of the coalesced particles by air flotation.

After the separation of the coalesced particles, the remaining water, oil, anionic polymer and any other additive remaining in the produced water exit the intermediate separation device 200 as continuing first treated produced water stream 210.

The second reagent can be added to the continuing first treated produced water stream 210 at a second reagent injection point 215. The second reagent injection point 215 is located in the continuing first treated produced water stream 210 downstream of the first reagent injection point 115, and if present, intermediate separation device 200. The second reagent injection point 215 connects the continuing first treated produced water stream 210 to a second reagent stream 260, which is supplied from, and is in fluid connection with, a second reagent storage tank 250. The second reagent is normally supplied as part of a liquid mixture, preferably a solution of the second reagent in water.

The addition of the second reagent to the continuing first treated produced water stream 210 produces a second treated produced water stream 220 comprising water, remaining anionic polymer, remaining oil, first reagent, second reagent and any other additives from the CEOR still present in the stream after an intermediate separation in the intermediate separation device 200. Typically, the second reagent is added to the continuing first treated produced water stream 210 to provide a concentration of from 10 to 1000 ppm of the second reagent in the second treated produced water stream 220.

The second treated produced water stream 220 may then be passed to a second treated produced water separation device 300. The second treated produced water separation device 300 can separate a further portion of the residual oil and anionic polymer from the continuing first treated produced water stream 210.

It is preferred that the second reagent is added to the continuing first treated produced water stream 210 sufficiently upstream of the second treated produced water separation device 300 (but downstream of the intermediate separation device 200 if present, and if not present, downstream of the first reagent injection point 115) to allow mixing of the second reagent with the continuing first treated produced water stream 210. As the contact time between the second reagent and the (continuing) first treated produced water stream increases, so the overall separation is improved. Typically, the addition of the second reagent should occur at least 30 seconds, preferably at least 2 minutes, more preferably at least 10 minutes prior to the separating step in the second treated produced water separation device 300. Thus, taking account of the flow rate of the continuing first treated produced water stream 210, the second reagent injection point 215 should be located at a point to allow mixing and maximise the interaction of the second reagent with the produced water in the second treated produced water stream 220 prior to the final separation step.

The second treated produced water separation device 300 separates a further portion of the oil from the second treated produced water stream 220. Preferably, the second treated produced water separation device 300 is an air flotation separation device. The addition of air to the second treated produced water stream 220 assists the removal of particles flocculated by the action of the first and second reagents. The gas bubbles in the stream attach to the flocculated particles, allowing for their flotation and removal from the second treated produced water stream. The coalesced particles may comprise oil, anionic polymer, first reagent and second reagent. Upon floatation, the coalesced particles can be separated from the second treated produced water stream 220, and removed from the second treated produced water separation device 300 as second treated agglomerate stream 320. The second treated agglomerate stream 320 comprises the coalesced particles and water.

A treated water stream 310, which is a clarified water stream is produced after removal of the coalesced particles. The treated water stream 310 comprises water. The treated water stream 310 comprises a greatly reduced concentration of oil and anionic polymer compared to that of produced water stream 110. Typically, the treated water stream can comprise <29 mg/L, rendering it acceptable for discharge.

The Examples below show both the effect of the process described herein in removing residual oil from produced water, and also the synergy obtained from the sequential use of the first and second reagents to remove oil.

EXPERIMENTAL

The following reagents were used in the Examples below:
Ferric sulfate: this product is a blend of ferric sulfate, monoethylene glycol and water.

Dithiocarbamate polymer: It is an ethylene dichloride ammonia polymer backbone containing dithiocarbamate salt groups having a molecular weight in the range of from 1500 to 5000 and from 25 to 40 mole % of the NH containing groups converted to dithiocarbamate salt groups.

Example 1

A brine solution was prepared to mimic North Sea produced water as follows:

| Na | 30314.0 | mg/L |
|---|---|---|
| Ca | 3924.0 | mg/L |
| Mg | 622.0 | mg/L |
| K | 513.0 | mg/L |
| Sr | 672.0 | mg/L |
| Cl | 56618.0 | mg/L |
| pH: | 7.20 | |

Oil content: 2000 ppm obtained from the Skarv oil field, sampled from first stage separator. CEOR anionic polymer content: 2000 ppm, dry, anionic flocculant with 30% charge density. The anionic polymer was mixed into the synthetic brine using an Ultra Turrax homogenizer (IKA-Werke GmbH & Co. KG, Staufen, Germany) for 30 minutes at 20,000 rpm. After the polymer was completely dissolved in the brine, the oil was added and mixed for an additional 5 minutes to ensure a stable emulsion. Both the first and second reagents were added as 1 wt. % solutions.

Figure 2:
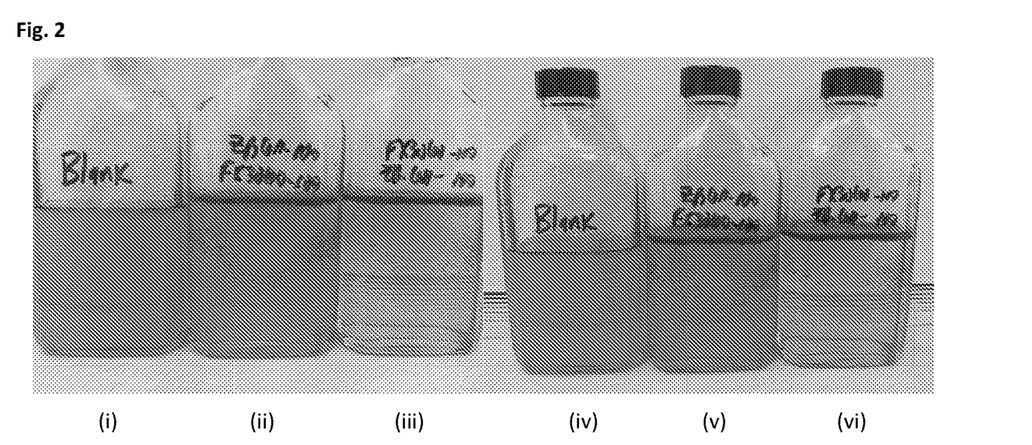
FIG. 2 shows two untreated samples of a synthetic emulsion similar to produced water as (i) and (iv); two samples treated according to the process of the invention in which the first reagent is ferric sulphate and the second reagent is a dithiocarbamate polymer as (ii) and (v); and two samples treated according to the process of the invention in which the first reagent is a dithiocarbamate polymer and the second reagent is ferric sulphate as (iii) and (vi).

Test Protocol: An appropriate amount of the prepared synthetic emulsion was added to a prescription bottle and the bottle was shaken to ensure homogeneity. The required amount of the first reagent was then added; the bottle was capped and shook 50 times to simulate medium agitation. The second reagent was then added; the bottle was capped and shaken an additional 50 times to simulate medium agitation. The bottles were allowed to sit undisturbed and were observed for water clarity. In this test, dithiocarbamate polymer and ferric sulphate were used at 100 ppm. Two tests were performed in duplicate where each product was added first then the second was added to determine the effect of the order of addition. FIG. 2 shows untreated synthetic emulsion samples (i) and (iv). FIG. 2 (ii) and (v) shows the treated synthetic emulsion from duplicate runs in which the ferric sulphate solution is added first, followed by the dithiocarbamate polymer solution second. FIG. 2 (iii) and (vi) shows the treated synthetic emulsion from duplicate runs in which the dithiocarbamate polymer solution is added first and the ferric sulphate solution is added second.

As can be observed in FIG. 2, the order of addition of the products affects the resulting water quality. The combination of dithiocarbamate polymer as the first reagent followed by ferric sulphate as the second reagent (FIG. 2 (iii) and (vi)) performed significantly better than ferric sulphate followed by the dithiocarbamate polymer (FIG. 2 (ii) and (v)).

Figure 3:
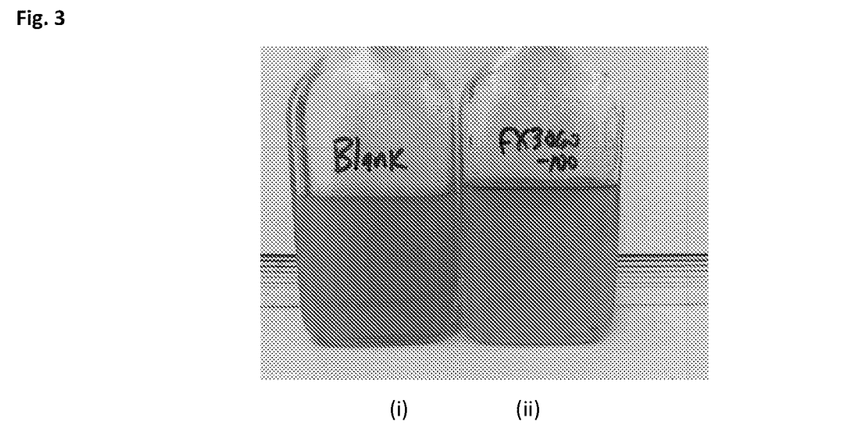
FIG. 3 shows an untreated sample of a synthetic emulsion similar to produced water as (i) and a sample treated only with a dithiocarbamate polymer (ii) as a comparison with the process of the invention.
Figure 4:
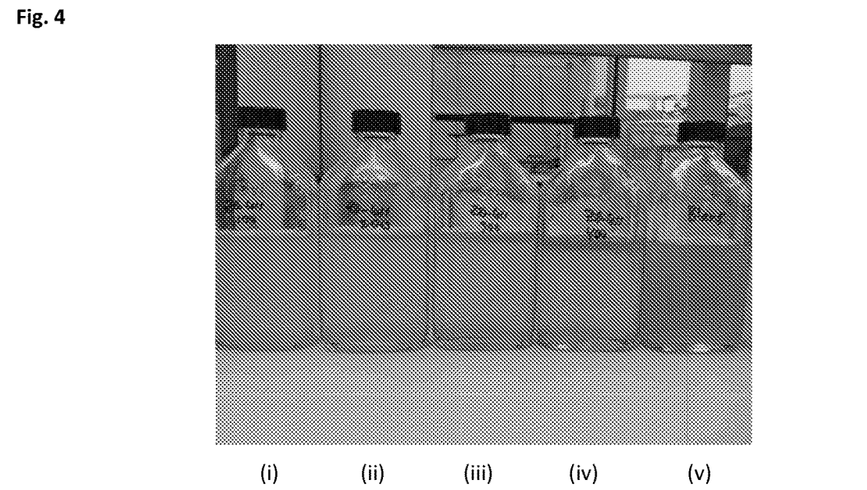
FIG. 4 shows an untreated sample of a synthetic emulsion similar to produced water as (v) and samples treated with different concentrations of only ferric sulphate of 100 ppm, 200 ppm, 300 ppm and 400 ppm as (i)-(iv) respectively as a comparison with the process of the invention.

As shown in FIG. 3, dithiocarbamate polymer at 100 ppm by itself is not effective in removing the oil. In particular, FIG. 3 (i) shows untreated synthetic emulsion, while FIG. 3 (ii) shows synthetic emulsion treated with 100 ppm dithiocarbamate polymer. FIG. 4 shows the limited effect of varying concentrations of ferric sulphate by itself. In particular, FIG. 4 (v) shows untreated synthetic emulsion, while FIG. 4 (i)-(iv) show synthetic emulsion treated with 100, 200, 300 and 400 ppm ferric sulphate respectively. FIGS. 3 and 4 show comparative data.

Example 2

A brine solution was prepared to mimic North Sea produced water as follows:

| Na | 30314.0 | mg/L |
|---|---|---|
| Ca | 3924.0 | mg/L |
| Mg | 622.0 | mg/L |
| K | 513.0 | mg/L |
| Sr | 672.0 | mg/L |
| Cl | 56618.0 | mg/L |
| pH: | 7.20 | |

Oil content: 2000 ppm obtained from the Skarv oil field, sampled from first stage separator. CEOR anionic polymer content: 2000 ppm, dry, anionic flocculant with 30% charge density. The anionic polymer was mixed into the synthetic brine using an Ultra Turrax homogenizer for 30 minutes at 20,000 rpm. After the polymer was completely dissolved in the brine, the oil was added and mixed for an additional 5 minutes to ensure a stable emulsion.

The first and second reagents were added to provide 50 ppm of each reagent in the synthetic emulsion.

The synthetic emulsion was placed into the reservoir of a bench top WEMCO® floatation device to determine how effective flotation is in clarifying the water. The first reagent was added and the WEMCO was started and set at the desired rotational speed. The treated emulsion was mixed in the WEMCO for 5 minutes. The reservoir was then sampled to determine the single product's efficacy. The second reagent was added and the WEMCO floatation device continued to mix for an additional 5 minutes. After the second 5 minute mix, the reservoir was sampled again to determine the efficacy of both products. In Test 1, the dithiocarbamate polymer was added first and the ferric sulfate added second. In Test 2, ferric sulfate was added first while the dithiocarbamate polymer was added second.

Figure 5:
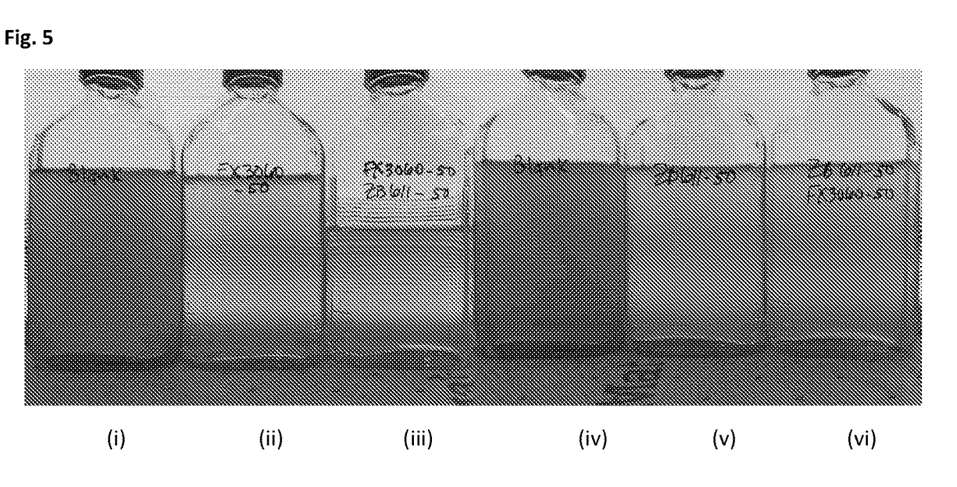
FIG. 5 shows untreated samples of a synthetic emulsion similar to produced water as (i) and (iv). A sample treated with dithiocarbamate polymer as the first reagent is shown as (ii). A sample treated with dithiocarbamate polymer as the first reagent and ferric sulphate as the second reagent is shown as (iii). A sample treated with ferric sulphate as the first reagent is shown as (v). A sample treated with ferric sulphate as the first reagent and dithiocarbamate polymer as the second reagent is shown as (vi).

FIG. 5 shows untreated synthetic emulsion samples (i) and (iv) of Tests 1 and 2 respectively. FIG. 5 (ii) shows the synthetic emulsion after treatment with dithiocarbamate polymer as the first reagent. FIG. 5 (iii) shows the synthetic emulsion of FIG. 5(ii) after treatment with ferric sulphate as the second reagent in Test 1. FIG. 5 (v) shows the synthetic emulsion after treatment with ferric sulphate as the first reagent. FIG. 5 (vi) shows the synthetic emulsion of FIG. 5(v) after treatment with dithiocarbamate polymer as the second reagent in Test 2.

The results show that for Test 1, dithiocarbamate works well to clarify the water when used alone, but when used in conjunction with ferric sulfate, the water is further clarity improved. For Test 2, ferric sulfate added first does not produce water with the clarity of Test 1, regardless of whether it is used alone or with the dithiocarbamate. The result from these tests shows the following: 1) order of addition of the dithiocarbamate and ferric sulfate affects the resulting water quality. The order of addition will need to be determined by a simple test such as the one carried out in this example on fluids obtained from the field and 2) the WEMCO flotation device alone is not effective in clarifying the water to acceptable limits. This result shows the importance of a chemical and mechanical solution when trying to clarify polymer flood produced water.

Example 3

A brine solution was prepared to mimic North Sea Produced Water as follows:

| Chloride | 13240 | mg/l |
|---|---|---|
| Sulphate | 1195 | mg/l |
| Calcium | 206 | mg/l |
| Strontium | 3.6 | mg/l |
| Magnesium | 562 | mg/l |
| Sodium | 7726 | mg/l |
| Potassium | 218 | mg/l |

Sample preparation: A mixture of 20% oil from the Foinaven field and 80% brine water along with 100 ppm polymer (liquid anionic flocculant with 30% charge density) was placed into a beaker. The beaker was heated to 70° C. and after the beaker reached the target temperature, the mixture was sheared using an Ultra Turrax homogenizer for one minute at 20,000 rpm. After the shearing step, the mixture was placed into a 2000 mL separator funnel where the mixture was allowed to separate for seven and a half minutes. After the separation time, the water portion was collected and tested using a jar tester with a DAF simulation apparatus to determine the effectiveness of the chemical treatment both alone and with mechanical assistance. The oil in water concentration and d50 droplet size were measured using a Visual Process Analyser (ViPA, Jorin Limited, Whetstone, UK).

DAF Simulation Procedure:

A jar testing device and a dissolved air flotation (DAF), supplied by MICROFLOC Pty Ltd of Castle Hill, Australia, was used to select chemical treatments where air flotation systems are used for solid liquid separation. The DAF simulator consists of a saturator and a manifold feeding system. Deionised water was added to the saturator and air is bubbled into the water column, thereby dissolving into the water. A valve on the bottom of the saturator was opened and a manifold ensured that an accurate amount of air saturated water is fed into the ports that were attached. The DAF simulator was used in conjunction with a standard four position jar tester with specially outfitted beakers which were attached to the distribution manifold of the DAF simulator.

Jorin ViPA Procedure:

The Jorin ViPA is a particle size analysis system designed to operate continuously, on-line and at process temperature and pressure or in the laboratory in a batch type mode. The ViPA uses a video microscope to capture images of the discrete objects, or 'species' (i.e. solid particles, liquid droplets, gas bubbles), present in a given process stream. Image analysis techniques are then applied to differentiate between the different object populations present and the measurable characteristics of these populations—such as size, size distribution and relative concentrations by the instrument.

Figure 6:
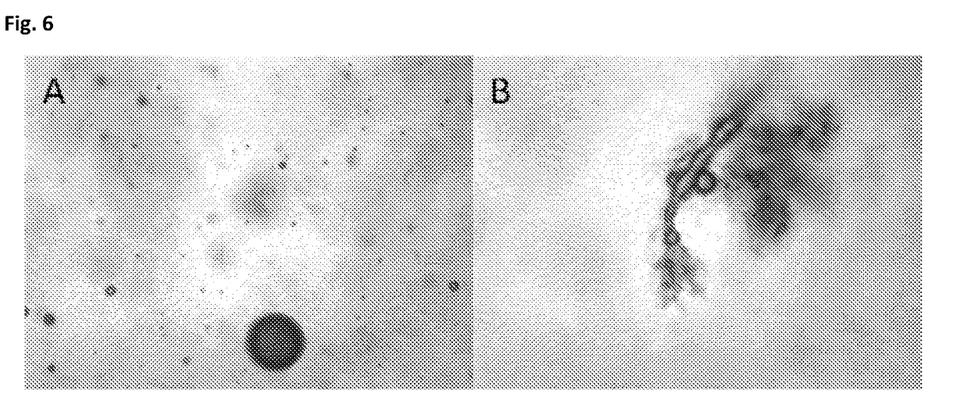
FIG. 6 shows video microscope images from a Visual Process Analyser.
Figure 7:
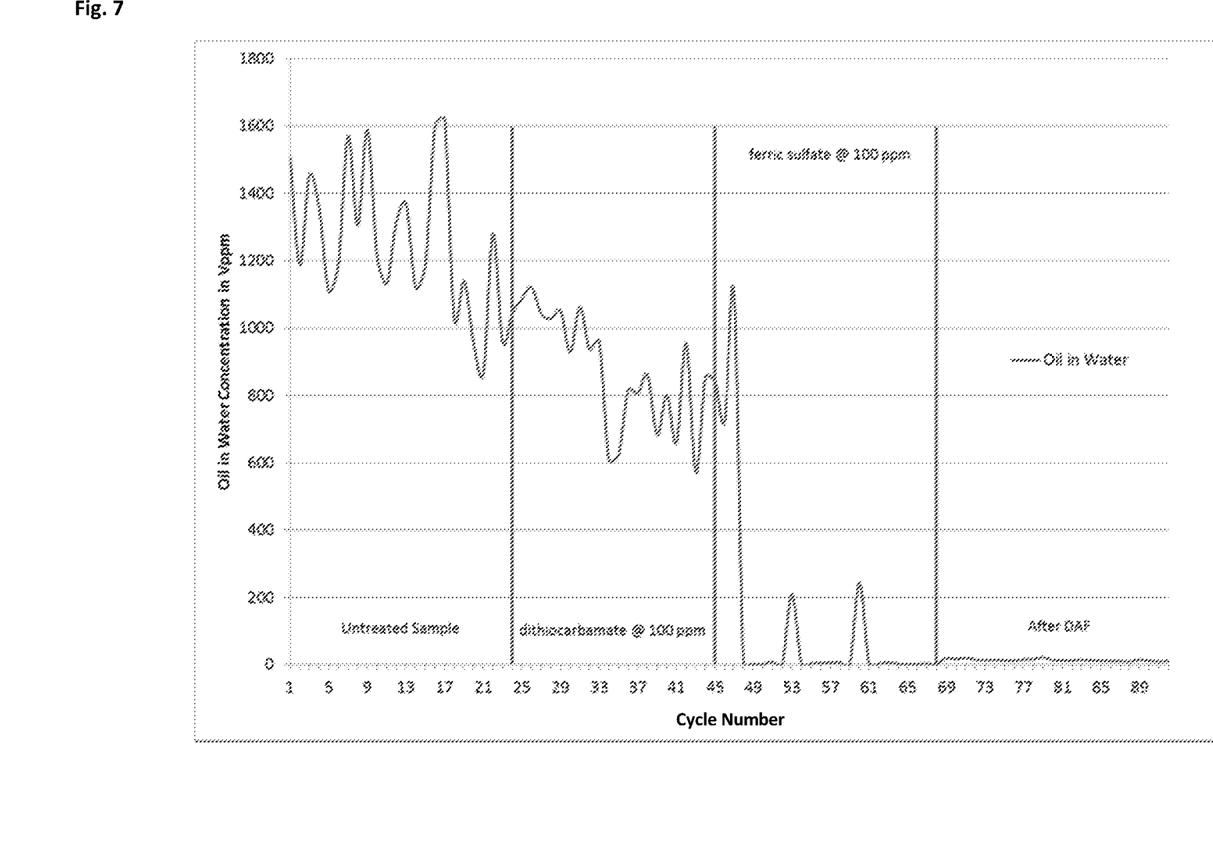
FIG. 7 shows the results of a dissolved air flotation simulation according to the process of the invention as a plot of oil in water concentration versus cycle number. A cycle number corresponds to 20 seconds of data collection and 15 seconds of no collection, such that each cycle represents a period of 35 seconds.

The ViPA was used to determine oil in water concentration and oil droplet size at various points in the process: the untreated sample, after first chemical addition, after second chemical addition and after dissolved air flotation. The ViPA allowed the determination of the effectiveness of each part of the chemical and mechanical treatment system. FIG. 6 A and B provides two examples of ViPA images captured from the high speed camera.

500 mL of water collected from the separation step was added to the jar test beakers. The jar tester was started and set at 200 rpm to simulate high agitation. The ViPA was optimized in accordance with the standard operation procedure (Jorin ViPA Software Operating Manual Issue 5.4xx, Revision 1—Firewire August 2012). An analysis run of 24 cycles was started on an untreated sample, where one cycle consisted of 20 seconds of data collection and 15 seconds of no collection, for the purposes of a blank comparison. The following protocol was followed:

a. Start ViPA run for 24 cycles on an untreated sample.
b. Add DTC and mix at 200 rpm for one minute.
c. Start ViPA run for 24 cycles while dithiocarbamate is mixing at 200 rpm.
d. Upon completion of ViPA run, add ferric sulfate at 100 ppm and mix for one minute at 200 rpm.
e. Slow mixer to 50 rpm.
f. Start ViPA run for 24 cycles.
g. Upon completion of ViPA run, stop the mixer and add the requisite amount of air saturated water to the beaker.
h. Allow 5 minutes for flotation to take effect.
i. Start ViPA run for 24 cycles.

The results from Example 3 show that the DTC product alone was only able to remove 30.5% of the oil (average of 871.36 ppm) as compared to the untreated sample (1254.04 ppm oil). Oil removal increases significantly when ferric sulfate is added, with an average oil removal efficiency of 91.9% (101.58 ppm). While the performance of the chemical treatment alone is somewhat effective, an oil in water value of 101.58 is still significantly higher than the permitted North Sea discharge limit of <30 mg/L oil in water and most likely, higher than desired for produced water reinjection systems. The results after air flotation show that an average of 13.22 ppm oil in water, or 98.9% oil removal can be achieved when the solution for polymer flood produced water contains both a chemical and mechanical treatment.

Other aspects and embodiments of the invention provide the aspects and embodiments described above with the term "comprising" replaced by the term "consisting of" and the aspects and embodiments described above with the term "comprising" replaced by the term "consisting essentially of".

The term "and/or" where used herein is to be taken as specific disclosure of each of the two specified features or components with or without the other. For example "A and/or B" is to be taken as specific disclosure of each of (i) A, (ii) B and (iii) A and B, just as if each is set out individually herein.

It is to be understood that the application discloses all combinations of any of the above aspects and embodiments described above with each other, unless the context demands otherwise. Similarly, the application discloses all combinations of the preferred and/or optional features either singly or together with any of the other aspects, unless the context demands otherwise.

Modifications of the above embodiments, further embodiments and modifications thereof will be apparent to the skilled person on reading this disclosure, and as such these are within the scope of the present invention.

All documents mentioned in this specification are incorporated herein by reference in their entirety for all purposes.

The invention claimed is:

1. A process for the treatment of produced water from polymer flood chemical enhanced oil recovery, said process comprising:
    providing produced water (110) comprising water, an anionic polymer and oil;
    first treating the produced water with a first reagent (160) to provide first treated produced water (120);
    second treating the first treated produced water with a second reagent (260) to provide second treated produced water (220) comprising water and agglomerates comprising oil, anionic polymer, first reagent and second reagent; and
    separating the water and agglomerates of the second treated produced water to provide treated water (310) and separated agglomerates (320);
    wherein, the first and second reagents are added separately so that the first and second treating steps are separated by a period of at least 30 seconds;
        the first reagent comprises a water-soluble dithiocarbamate polymer comprising dithiocarbamate groups and dithiocarbamate salt groups and has a molecular weight of 500 or more, and
        the second reagent comprises a metal ion selected from the group comprising a cation of a transition metal, aluminum and lead.

2. The process of claim 1 wherein the cation of a transition metal comprises a cation selected from the transition metals of groups 7 to group 12 of the periodic table.

3. The process of claim 2 wherein the cation of the transition metal is selected from one or more of the group comprising Hg(II), Ag(I), Cd(II), Cu(II), Zn(II), Co(II), Ni, Fe(II) and Mn(II).

4. The process of claim 3 wherein the metal ion comprises Fe(II).

5. The process of claim 1 wherein the dithiocarbamate polymer comprises a dithiocarbamate polyamine polymer, wherein the dithiocarbamate polyamine polymer is a polyethylenimine or a copolymer of an acrylic-OH or an acrylic-$OR^4$ monomer and a polyamine monomer in which $R^4$ is a hydrocarbon group having from 1 to 10 carbon atoms or a $NHR^5$ group or $OR^4$ together is a salt of a hydroxyl group, or a dithiocarbamate polyimide polymer, wherein from 5 to 100 mole % of the —NH groups are converted to dithiocarbamate and dithiocarbamate salt groups.

6. The process of claim 5, wherein from 5 to 50 mole % of the —NH groups are converted to dithiocarbamate and dithiocarbamate salt groups.

7. The process of claim 1 wherein the dithiocarbamate polymer is added in an amount of 0.9 to 2.5 mole equivalents based upon the metal ion.

8. The process of claim 1 wherein the separating step (300) comprises mechanically separating the second treated produced water.

9. The process of claim 8 wherein the mechanical separation (300) is carried out using one or more of a hydrocyclone, a corrugated plate interceptor, a compact flotation unit and a gas flotation unit.

10. The process of claim 1, further comprising, between the first and second treating steps, an intermediate separating step (200) of:
    separating a portion of the oil from the first treated produced water.

11. The process of claim 10 wherein the intermediate separating step (200) is carried out using a hydrocyclone and optionally gas bubbles.

12. The process of claim 1 wherein the produced water (110) is provided by the steps of:
    providing a polymer flood (90) from a production well, said polymer flood comprising water, an anionic polymer and crude oil; and
    separating the polymer flood to provide recovered crude oil (130) and the produced water (110) comprising water, an anionic polymer and oil as residual oil.

13. The process of claim 1 wherein the metal ion comprises Fe(II), the dithiocarbamate polymer comprises a dithiocarbamate polyamine polymer, wherein the dithiocarbamate polyamine polymer is a polyethylenimine or a copolymer of an acrylic-OH or an acrylic-$OR^4$ monomer and a polyamine monomer in which $R^4$ is a hydrocarbon group having from 1 to 10 carbon atoms or a $NHR^5$ group or $OR^4$ together is a salt of a hydroxyl group, or a dithiocarbamate polyimide polymer, wherein from 20 to 40 mole % of the —NH groups are converted to dithiocarbamate and dithiocarbamate salt groups, and the dithiocarbamate polymer is added in an amount of 0.9 to 2.5 mole equivalents based upon the metal ion.

14. The process of claim 13, wherein from 25 to 30 mole % of the —NH groups are converted to dithiocarbamate salt groups.

* * * * *